June 29, 1965   W. O. BURKE   3,191,244
SECTIONAL COOLER LATCH
Filed March 27, 1962   3 Sheets-Sheet 2
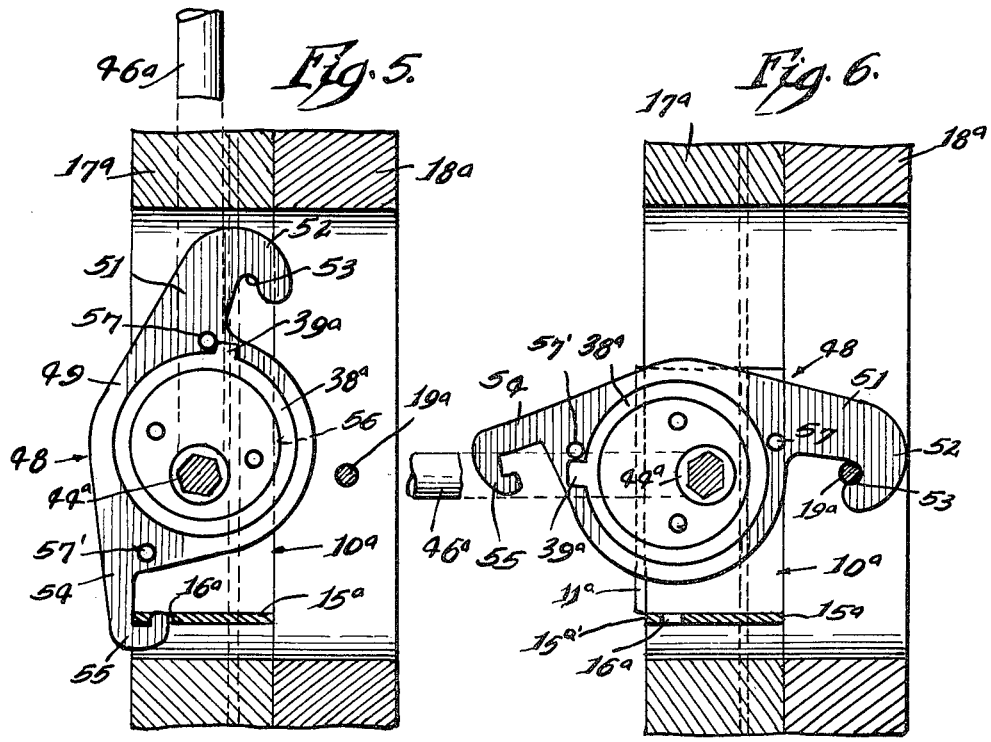
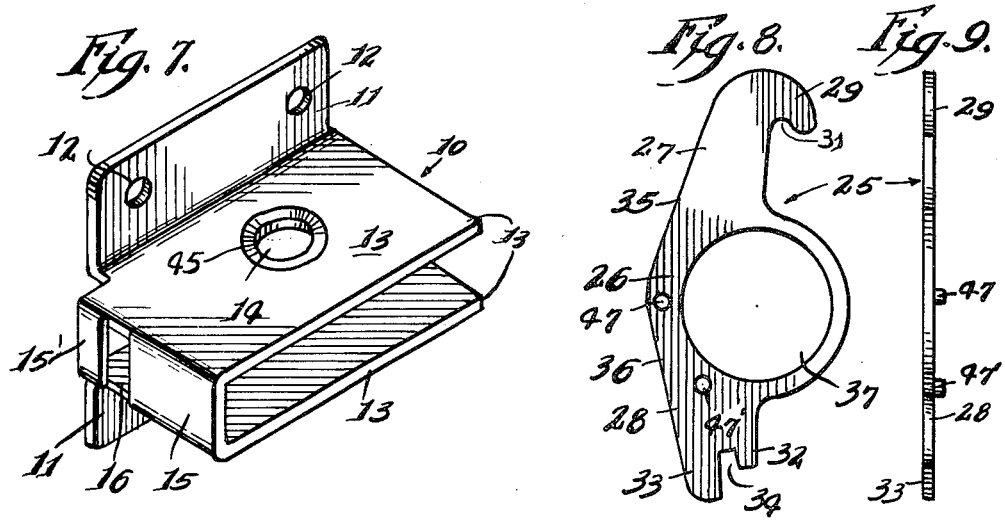
Inventor.
William O. Burke
By. Wilson Geppert
Attorneys

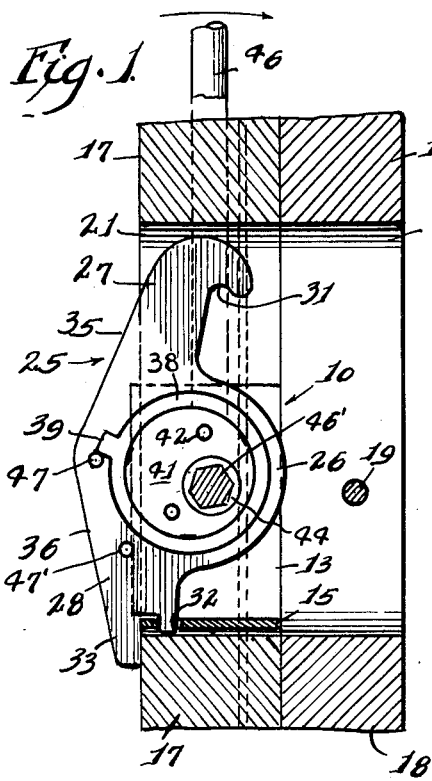

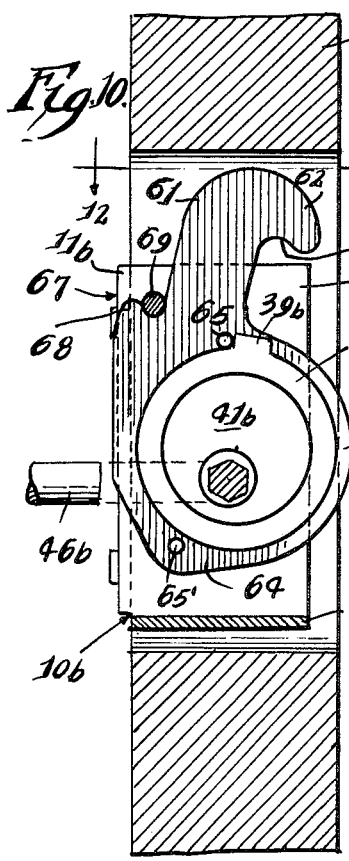
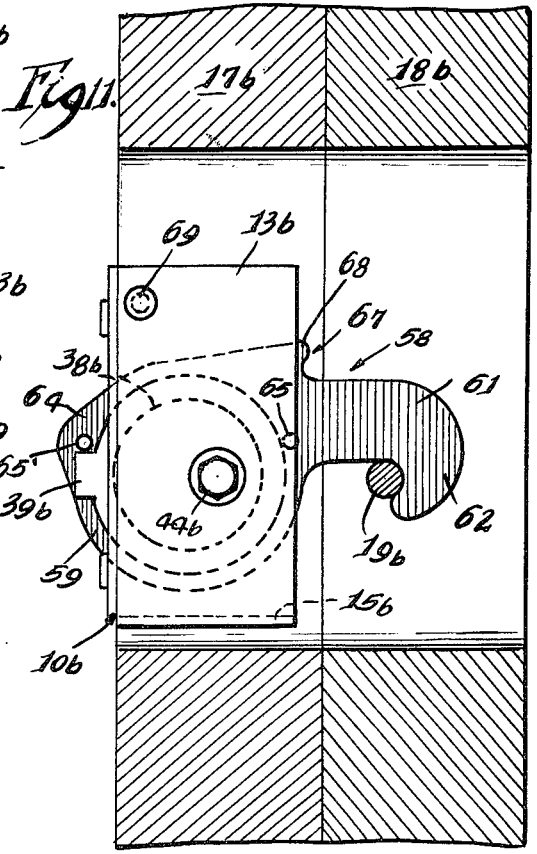
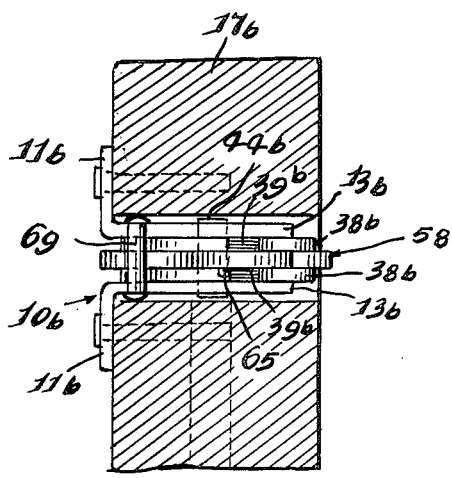

United States Patent Office 3,191,244
Patented June 29, 1965

3,191,244
SECTIONAL COOLER LATCH
William O. Burke, Rockford, Ill., assignor to National Lock Co., Rockford, Ill., a corporation of Delaware
Filed Mar. 27, 1962, Ser. No. 182,849
11 Claims. (Cl. 20—92.4)

The present invention relates to a latch mechanism and more particularly to a novel latch assembly for joining abutting sections of an industrial cooler and which will clamp the sections together and provide sealing pressure to prevent leakage at the junction.

In large industrial plants and installations, the requirements for a cooling appartus may well exceed the dimensions of normal industrial cooler units. In such cases, a cooler is manufactured of sections which may be added one to another until the cooler is of a size of the required dimensions. The use of interlocking sections provides a high degree of flexibility, but the joints or junctions of the cooler sections must be properly aligned and sealed so as to avoid leakage. The present invention provides a solution to the latching problem involved in joining such cooler sections.

The present invention relates to a novel latch assembly which both latches and clamps two adjacent cooler sections together with sufficient pressure to effectively seal the junction of the two abutting sections to prevent leakage. The invention resides in a pivotal latch bolt or hook member mounted in one section which engages and interlocks with a strike or pin in the other section and in camming means which rotate in an opening in the latch bolt or hook member and have their point of rotation offset from the center of the camming means. A crank or the like is utilized to actuate the camming means and the latch hook bolt.

An object of the present invention is the provision of a novel latch assembly for sectional coolers and the like which latches and clamps two sections together. The engagement of the latch means may be made with the two sections separated slightly as operation of the latch draws the two sections together and clamps as well as locks the sections in sealing engagement.

A further object of the invention invention is the provision of a novel latch means having a limited arc of rotation for camming means on the latch member to prevent breakage or release of the latch member by over-exertion during the locking operation. The camming means provide longitudinal as well as rotational motion for the latch member due to the novel construction and arrangement of the latch means and having stop means so formed as to limit the rotation of the camming means.

Another object of the present invention is the provision of a novel latch member with means to lock the latch member in open position to prevent accidental engagement thereof. Also, having the latch member in a locked open position facilitates assembly of the cooler sections prior to clamping the sections together.

The present invention also comprehends a novel latching assembly which is mounted within the walls of adjoining cooler sections and operated through a crank member or suitable tool the end of which is projected into a conforming opening in the side of one section and an opening in the camming means. The crank is rotated to rotate the camming means and the latching hook bolt. The walls of the sections are constructed to provide a tongue and groove joint with sealing means extending parallel along both sides of the tongue.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a side elevational view of one embodiment of the present invention with the latch housing partially broken away to show the latching member in its locked open position.

FIG. 2 is a view similar to FIG. 1 except that the latching member is in its locking position engaging a latching pin or rod in the adjoining cooler section.

FIG. 3 is a view similar to FIGS. 1 and 2 and showing the latching member in an intermediate position as the bolt is unlatched.

FIG. 4 is a cross-sectional view of the latching member taken on the line 4—4 of FIG. 2, with the actuating crank removed.

FIG. 5 is a side elevational view of a second embodiment of the present invention with the housing partially broken away and showing the locking member in its locked open position.

FIG. 6 is a side elevational view of the latch bolt shown in FIG. 5 in its locking and clamping position.

FIG. 7 is a perspective view of the latch housing with the latch bolt and latch bolt cams removed.

FIGS. 8 is a front or side elevational view of the disassembled latch bolt of FIGS. 1 to 4.

FIG. 9 is an edge or end view of the bolt of FIG. 8.

FIG. 10 is a side elevational view of a third embodiment of the present invention with the housing partially broken away and showing the locking member in its locked open position.

FIG. 11 is a side elevational view similar to FIG. 10 but with the housing complete and the parts in their locking and clamping position.

FIG. 12 is a cross-sectional view taken on the line 12—12 of FIG. 10 and looking in the direction of the arrows.

Referring to the disclosure in the drawings in which are shown illustrative embodiments of the present invention, the novel latching means as shown in the embodiment of FIGS. 1 to 4, inclusive, comprises a housing 10 having laterally extending mounting flanges 11, each flange having spaced openings 12 to accommodate suitable screws or fastening means. The housing (see FIG. 7) includes spaced parallel sides 13 having central aligned openings 14 and connected by a web or bottom portion 15. A locking opening 16 is formed adjacent one end of the bottom portion 15 to provide a narrow connecting portion 15' for a purpose to be later described. As further shown, adjoining sections 17 and 18 of the cooler mount the housing 10 and a lateral extending latch pin or rod 19, respectively. The section 17 contains an elongated vertical slot 21 within which the housing 10 is mounted with the flanges 11 extending onto the walls of either side of the slot. This slot extends through a longitudinally or vertically extending tongue 22 formed on the edge of the section 17. A complementary groove 23 is formed in the edge of the adjoining section 18 to receive the tongue 22. An elongated slot 24 in section 18 aligned with the slot 21 receives the engaging end of the latch bolt assembly in the latching position and contains the latch pin or rod 19 extending laterally in the slot 24.

The latching assembly includes a latch bolt 25 formed from a flat sheet of metal and having a generally circular body portion 26 (FIG. 8) with offset oppositely extending arms 27 and 28. The arm 27 terminates in a latching hook member 29, the underside of the hook being undercut as at 31 to receive and retain the lateral latch pin or rod 19 in latched position. The opposite arm 28 terminates in a pair of spaced projections 32 and 33 of unequal length separated by a notch 34. The shorter arm 32 is conformably received in the opening 16 formed in the connecting bottom portion 15 of the housing 10. The outer surfaces 35 and 36 of the arms 27 28, respectively, are generally straight and intersect each other in the body portion 26 in an obtuse angle.

The rounded body portion 26 has a central circular opening 37 cooperating with a pair of cam members 38 one at each side of the latch bolt 35. The cam members 38 are identical and each is circular in shape with an ear 39 projecting from the periphery thereof. The central portion 41 of each cam 38 is depressed with the depression conformably received within the central opening 37 in the latch bolt 25. The cams 38 with their central depressions extending into the central opening 37 from each side of the latch bolt 25 are riveted together by rivets 42 extending through openings in the cams so that the projections or ears 39 are identically positioned on the two cams.

Each cam also contains a hexagonal or polygonal opening 43 offset or eccentrically disposed from the center of the cam which is defined by an extruded boss or sleeve 44 in the cam and extending outwardly and aligned with the opening 14 in the sides 13 of the housing 10. The area immediately surrounding the openings 14 is depressed as at 45 to extend into the depressions 41 of the cams and encompass the bosses 44 when assembled to provide a substantially unitary assembly. A suitable tool such as a crank 46 with a hexagonal head or end 46' is inserted into the bosses 44 and rotated to actuate the cams.

The latch bolt 25 also includes projections or studs 47, 47' formed slightly beyond the periphery of the cams 38 with one projection 47 located adjacent the intersection of surfaces 35 and 36, the second projection 47' formed on the the central body 26 removed slightly from the base of the arm 28. These two projections 47, 47' are engaged by the ears 39 whereby to limit the arc of travel of the cams 38.

Considering the operation of this latch in FIG. 1, the latch bolt is shown in its locked open position with the notch 34 on the arm 28 straddling the connecting portion 15' of the housing 10 and the ears 39 of the cams 38 abutting the projection 47. The crank 46 is inserted into the boss 44 and rotated in the direction of the arrow as seen in FIG. 1 of the drawing to actuate the cams 38. Initial rotary movement of the cams relative to the latch bolt 25 lifts the latch bolt until the short projection 32 on the arm 28 is free of the opening 16 and then the latch bolt 25 and cams 38 rotate as a unit due to the frictional engagement therebetween until the arm 27 abuts the lateral latch pin 19 in the adjoining section. The cams 38 then rotate relative to the latch bolt 25 to draw and cause said bolt to engage the pin 19 with the undercut 31 of the hook 29 on the arm 27 to clamp the adjacent cooler sections together. As the sections are drawn together by the latch bolt, the ears 39 approach and abut the projection or stop 47' on the latch bolt body 26 is seen in FIG. 2.

To release the latch bolt from engagement as shown in FIG. 2, the crank 46 is rotated in the opposite direction with initial rotation of the cams 38 effecting movement of the latch bolt 25 until the hook 29 clears the rod 19. The latch bolt and cams then rotate together until the shorter projection 32 abuts the connecting section 15' of the housing 10. The cams 38 then rotate relative to the latch bolt 25 lifting the latch bolt until the projection 32 is lifted above the connecting portion 15' to allow a slight rotation of the latch bolt until the longer projection 33 abuts the portion 15', and then further rotation of the cams lowers the arm 27 of the latch bolt 25 with the projections 32 and 33 straddling the connecting portion 15' to lock the latch bolt in open position. The lowering of the latch bolt continues until the ears 39 abut the projection 47.

The embodiment of the latch bolt disclosed in FIGS. 5 and 6 is generally similar to the previously described embodiment except for changes in the form of the latch bolt. The housing 10$^a$ is formed exactly the same with the opening 16$^a$ in the connecting portion 15$^a$ and the anchoring flanges 11$^a$. The cams 38$^a$ having the ears 39$^a$ are identical to those shown in FIGS. 1 to 4. The latch bolt 48 again has a generally rounded body 49 with an upwardly extending arm 51 terminating in a hook or hooked end 52 which is undercut at 53 to receive the lateral latch pin or rod 19$^a$. The opposite arm 54 terminates in a generally square and upwardly opening hook 55. The latch bolt has a central opening 56 and a pair of projections 57, 57' to limit movement of the ears 39$^a$ of the cams 38$^a$. The projection 57 is located adjacent the base of the arm 51, and the other projection 57' is positioned adjacent the base of arm 54. Comparing the latch bolts 25 and 48, it is seen that the ears 39$^a$ of the cams 38$^a$ have a shorter arc of travel relative to the latch bolt than the ears 39 of the cams 38. The reason for this shorter arc will become apparent in considering the operation of this second embodiment.

Starting with the latch assembly in its locked open position (FIG. 5) with the hook 55 engaging the opening 16$^a$ in the housing and the ears 39$^a$ on the cams 38$^a$ abutting the projection 57 on the latch bolt body 49, the cams 38$^a$ have actuated bolt 48 to its substantially uppermost position. Inserting the crank 46$^a$ into the sleeve 44$^a$ and turning in a clockwise direction will actuate the cams 38$^a$ to rotate relative to the latch bolt 48 with a lowering of the bolt until the hook 55 is disengaged from the housing 10$^a$. Then the frictional engagement between the cams 38$^a$ and the latch bolt 48 will cause the bolt to rotate with the cams until the arm 51 of the latch bolt abuts the latch pin 19$^a$ in the adjoining section. The cams then rotate relative to the latch bolt to draw the hooked end 52 toward and engage the hook with the pin 19$^a$ and draw the panels or sections 17$^a$ and 18$^a$ together into clamped engagement. The ears 39$^a$ at this point abut the projection 57' to prevent further movement of the latch bolt.

To release the latch bolt 48 from the pin 19$^a$, the crank 46$^a$ engaging the sleeve 44$^a$ is rotated in the opposite direction to actuate the cams 38$^a$. Upon the initial movement of the cams, the latch bolt 48 is moved until the hook 52 is released from engagement with the pin 19$^a$, at which time the latch bolt and cams 38$^a$ rotate together until the arm 54 abuts the connecting portion 15$^{a\prime}$ of the housing 10$^a$. Then the cams 38$^a$ rotate relative to the latch bolt 48 and draw the bolt upwards until the ears 39$^a$ abut the projection 57, at which time the hook 55 engages the opening 16$^a$ to lock the latch bolt in open position (FIG. 5).

FIGS. 10 through 12, inclusive, disclose a third embodiment of the present invention which is generally similar to the previous two embodiments, but having the locking means for the latch bolt in open position rearranged from the previous embodiments. The housing 10$^b$ in the panel or section 17$^b$ is formed in the same manner as previously shown except for the absence of a locking opening in the connecting portion 15$^b$. The cams 38$^b$, each having a movement limiting ear 39$^b$, are identical with those shown in FIGS. 1 to 4. The latch bolt 58 has a generally rounded body 59 with an outwardly extending arm 61 having a hooked end 62 which is undercut at 63 to cooperate with a latch pin 19$^b$ in the panel or section 18$^b$. Substantially opposite the arm 61 the latch bolt has a slight bulge 64 mounting a projection 65'. Another projection 65 is located adjacent the base of the arm 61.

The latch bolt has a central opening similar to opening 37 shown in FIG. 8 to accommodate the central depressed portions 41$^b$ of the cams 38$^b$, with the ears 39$^b$ adapted to abut the projection 65 or 65'. Formed adjacent the base of the arm 61 at the edge opposite to the hooked end 62 is an upwardly opening hook 67 between the arm 61 and the projection 68. This hook 67 cooperates with a rivet or pin 69 extending through the parallel sides 13$^b$ of and secured to the housing 10$^b$ adjacent the upper corner by the mounting flanges 11ᵇ. The arc of travel of the ears 39ᵇ of the cams 38ᵇ relative to the latch bolt 58 is substantially the same as that shown in the embodiment of FIGS. 5 and 6.

With the latch assembly in its locked open position (FIG. 10) with the hook 67 engaging the rivet 69 in the housing 10ᵇ and the ears 39ᵇ abutting the pin 65 on the latch bolt body 59, the cams 38ᵇ have positioned the latch bolt in its uppermost position. Inserting the crank 46ᵇ into the sleeve 44ᵇ and turning in a clockwise direction will actuate the cams 38ᵇ to rotate relative to the latch bolt 58, thus lowering the bolt until the hook 67 is disengaged from the rivet or pin 69. Then the latch bolt 58 and cams 38ᵇ rotate together through an arc of approximately 75° until the arm 61 engages the pin 19ᵇ. Further rotation of the crank 46ᵇ rotates the cams 38ᵇ until the ears 39ᵇ abut the projection 65′ on the bulge 64 (FIG. 11) to draw the hooked end 62 into engagement with the pin 19ᵇ.

To release the latch bolt 58 from the pin 19ᵇ, the crank 46ᵇ engaging the sleeve 44ᵇ is rotated in a counterclockwise direction to actuate the cams 38ᵇ. Upon the initial movement of the crank, the cams 38ᵇ rotate relative to the latch bolt 58 and the latch bolt is cammed to move the hooked end 62 on the arm 61 away from the pin 19ᵇ until the hooked end is disengaged, whereupon further rotation of the crank, the cams 38ᵇ and latch bolt 58 rotate together until the arm 61 engages the rivet or pin 69. Then the cams 38ᵇ again rotate relative to the latch bolt 58 lifting the bolt upwards so that the hook 67 engages the rivet 69 and the ears 39ᵇ abut the projection 65 to lock the latch bolt in open position.

While the invention has been shown and described as being advantageously applicable to a sectional cooler, this invention comprehends the joining together of interior wall panels, display booths, knockdown crates and food display cases to name only a few uses. It is not my intent or desire to unnecessarily limit the scope or utility of the invention by virtue of the illustrative embodiments.

Having disclosed the invention, I claim:

1. A latch assembly mounted in one of a pair of adjoining panels for latching engagement with a latch pin in the other panel for joining the panels in abutting relation, comprising a housing having spaced sides with aligned openings therein, anchoring flanges on said sides and a connecting portion for said sides, and a latch bolt assembly rotatably mounted in said housing including a latch bolt having a body portion with a central circular opening therein, an arm extending from the body portion and offset from the center thereof, said arm terminating in a hook partion adapted to engage the latch pin in the adjoining panel, a locking projection extending from said body portion, locking means on said housing cooperating with said locking projection to retain the bolt in unlatched position, a pair of circular cam members of a diameter greater than the central opening having centrally circular depressed portions received within the opening in the body portion with a cam member on each side of and frictionally engaging the latch bolt, said central depressed portions abutting and secured together, said cam members having aligned offset openings extending through the depressed portions to receive a suitable tool for rotation of the cam members, an ear formed on the periphery of each cam member and a pair of spaced pins on the body portion of the latch bolt cooperating with said ears to limit the arc of movement of the cam members.

2. A latch assembly as set forth in claim 1, in which a boss is formed on the depressed portion of each cam member to define the offset opening therein and extends outward through the aligned openings in the spaced sides of the housing.

3. A latch assembly mounted in one of a pair of adjoining panels for latching engagement with a latch pin in the other panel for joining the panels in abutting relation, comprising a housing having spaced sides with aligned openings therein, anchoring flanges and a connecting portion between the sides and having a locking opening therein, and a latch bolt assembly rotatably mounted in said housing and including a latch bolt having a body portion with a central circular opening therein, substantially oppositely extending arms offset from the center of the body portion, one arm terminating in a hook portion adapted to engage the latch pin in the adjoining panel, the opposite arm terminating in a locking portion cooperating with the locking opening in the housing to retain the latch bolt in unlatched position, a pair of generally circular cam members having central depressed portions fitting within the opening in the latch bolt, a cam member located on each side of and frictionally engaging said latch bolt, said depressed portions abutting and secured together, each cam member having an offset opening aligned with the openings in the housing, an ear on the periphery of each cam member, and spaced projections on the latch bolt cooperating with the ear for limiting rotation of the cam members relative to the latch bolt.

4. A latch assembly as set forth in claim 3, in which the locking portion of said opposite arm includes a projection received in the locking opening in said housing when the latch bolt is in unlatched position.

5. A latch assembly as set forth in claim 3, in which said opposite arm terminates in a pair of spaced projections of unequal length, the shorter projection being received in the locking opening and the longer projection abutting the connecting portion of said housing when the latch bolt is in unlatched position.

6. A latch assembly mounted in one of a pair of adjoining panels for latching engagement with a latch pin in the other panel for joining the panels in abutting relation, comprising a housing having spaced parallel sides and a connecting bottom portion, said sides having aligned openings and said connecting portion having a locking opening adjacent one end, a latch bolt assembly rotatably mounted within said housing including a latch bolt having a body portion with a central circular opening therein, spaced first and second outwardly extending arms on said body portion and offset from the center thereof, the first arm terminating in a hook portion, the second arm terminating in a locking means cooperating with said locking opening in said housing, circular cam members mounted on and frictionally engaging each side of said latch bolt, each cam member having a central generally circular depressed portion received within the central opening in said latch bolt and abutting and secured together, each cam member having an offset opening in the depressed portion thereof, a boss formed on each cam member surrounding the offset opening and extending through said aligned openings in and extending beyond the sides of the housing, an ear formed on the periphery of each cam member, and a pair of spaced projections on said body portion and cooperating with said ear to limit the arc of movement of said cam members.

7. A latch assembly as set forth in claim 6, in which the locking means on said second arm includes a pair of spaced depending projections one of which is moved into engagement with the locking opening in said housing to retain the latch bolt in unlatched position.

8. A latch assembly as set forth in claim 6, in which said locking means on said second arm includes a depending projection lifted above said connecting bottom portion of said housing and then lowered to engage said locking opening for locking the latch bolt in unlocked position.

9. A latch assembly as set forth in claim 6, in which said locking means on said second arm includes a hooked end that is lifted into engagement with said locking opening from below said housing to lock said latch bolt in unlatched position.

10. A latch assembly mounted in one of adjoining panels for latching engagement with a latch pin in an adjoining panel for joining the panels in abutting relation, comprising a housing having spaced sides, anchoring flanges and a connecting portion for said sides, said sides having aligned openings therein, and a latch bolt assembly rotatably mounted within said housing and including a latch bolt having a body portion with a central circular opening therein, an arm extending from said body portion and offset from the center thereof, a hooked end on said arm to engage a latch pin for latching adjoining panels together, locking means on the periphery of the body portion adjacent said arm, a locking pin extending through and secured to said housing adjacent an upper corner and anchoring flanges cooperating with said locking means to retain the latch bolt in unlatched position, a pair of circular cam members on each side of and frictionally engaging the latch bolt, each cam member having a central depressed portion complementary to and received in said central opening in said latch bolt, said depressed portions abutting and secured together and having an offset opening therein aligned with the openings in the sides of the housing, an ear formed on the periphery of each cam member, and a pair of spaced projections formed on the latch bolt and cooperating with said ear to limit the arc of movement of said cam member.

11. A latch assembly as set forth in claim 10, in which said locking means includes a projection on the periphery of the body member adjacent the arm forming an upwardly opening hook lifted into engagement with and receiving said locking pin.

References Cited by the Examiner
UNITED STATES PATENTS

| | | | |
|---|---|---|---|
| 2,486,686 | 11/49 | Shreve | 292—111 |
| 2,647,287 | 8/53 | Jones | 20—4 |
| 2,714,751 | 8/55 | Stuart et al. | 20—92 |
| 2,784,019 | 3/57 | Des Combes | 292—111 |
| 2,896,989 | 7/59 | Ehret | 292—111 |
| 2,945,281 | 7/60 | Wilkirson | 292—111 |
| 3,048,435 | 8/62 | De Marco | 292—111 |

JACOB L. NACKENOFF, *Primary Examiner.*